No. 867,994.
PATENTED OCT. 15, 1907.
L. MURPHY.
APPARATUS FOR INDICATING THE DEPTH OF LIQUID IN A VESSEL.
APPLICATION FILED JAN. 30, 1907.
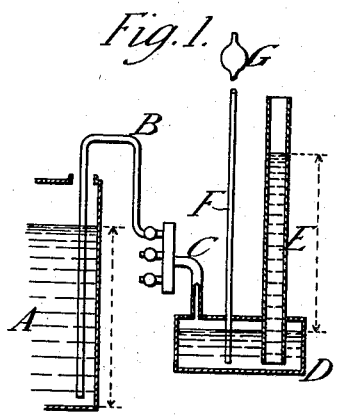
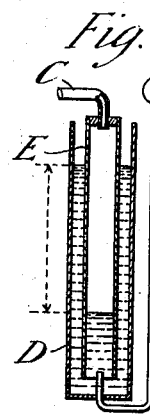
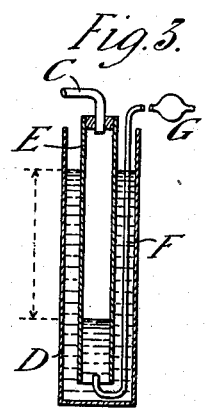
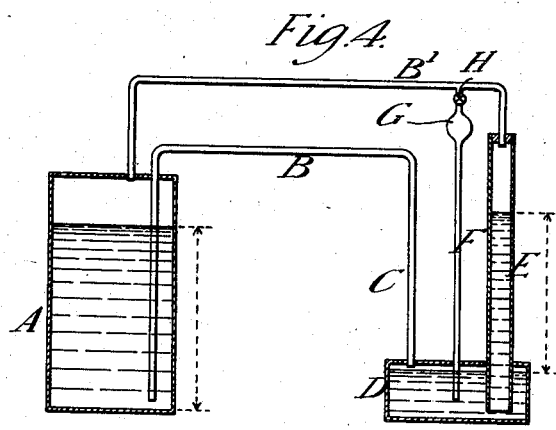
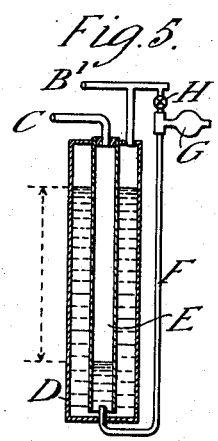
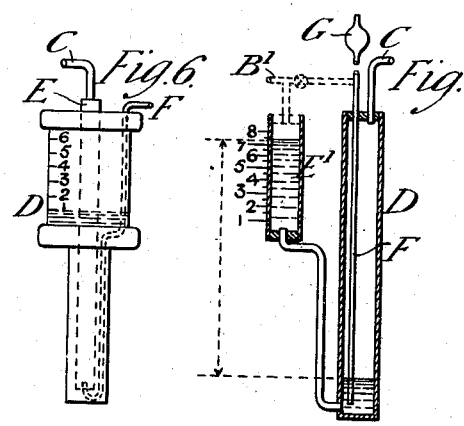
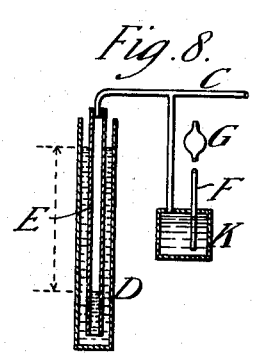
Witnesses.
Inventor.

UNITED STATES PATENT OFFICE.

LEONARD MURPHY, OF DUBLIN, IRELAND.

APPARATUS FOR INDICATING THE DEPTH OF LIQUID IN A VESSEL.

No. 867,994.  Specification of Letters Patent.  Patented Oct. 15, 1907.

Application filed January 30, 1907. Serial No. 364,791.

*To all whom it may concern:*

Be it known that I, LEONARD MURPHY, a subject of the King of Great Britain, residing at 156 Richmond road, County Dublin, Ireland, distiller, have invented certain new and useful Improvements in Apparatus for Indicating the Depth of Liquid in a Vessel, of which the following is a specification.

It has been proposed to indicate the depth of liquid in a vessel at a distance from such vessel by the pressure of air or gas introduced above the surface of an indicating liquid contained in a suitable gage reservoir, the excess air or gas being led by a pipe from the top of the gage reservoir to a point within and near the bottom of the liquid containing vessel, so that the pressure exerted on the indicating liquid surface is proportional to the depth of liquid in the distant vessel.

In some cases the air has been introduced by means of a separate compressor and passed through a valve into the indicating apparatus, while in other cases no valve was used, the compressor forming part of the indicating instrument and being always in direct communication with the air or gas supporting the column of indicating liquid.

In either case a leakage of air from the valve or compressor would vitiate the indications of the gage. This source of error is eliminated in the improved apparatus of the present invention by interposing a liquid seal between the compressor or valve and the gaseous pressure fluid within the gage reservoir. This is effected by connecting the compressor to the indicating apparatus through a tube of suitable diameter and length, the lower end of which is immersed in the indicating fluid of the gage reservoir. If air is blown or pumped down this tube, it will escape through the open submerged end into the liquid-free space of the closed gage or gage reservoir, and thence by the line pipe to the distant tank or vessel, the introduction of the air or gas being continued until the indicating column ceases to rise any higher in the gage glass, that is say until the surplus air or gas escapes from the submerged end of the pipe in the vessel to be gaged.

It will be obvious that on removing the pressure from the tube through which air is introduced, this tube will be sealed by the column of liquid forced into it by the pressure on the surface of the indicating liquid, and the liquid in the gage glass will remain steady at a reading which is less than the true pressure reading by an amount which depends on the area of the tube used and which may be made practically negligible, but in any case is constant.

The improved apparatus is illustrated diagrammatically in the accompanying drawings in which Figures 1, 2 and 3 show forms applicable to indicating the level of liquids in open vessels; Figs. 4 and 5 show the modifications necessary for applying the apparatus to liquid containing vessels which may be subject to pressure either greater or less than atmospheric; Figs. 6 and 7 show modified constructions of the indicator part of the apparatus for effecting a reduction in the length of the scale; and Fig. 8 shows a further modification in which different liquids are used in the indicating and sealing columns.

In these figures A is the vessel the liquid contents of which have to be gaged, B is the line pipe which extends downwards nearly to the bottom of the vessel A and is connected at its other end with a pipe C which opens into the closed air space of the indicating liquid reservoir D or gage glass E, the reservoir being closed at the top and the gage glass open in the former case, and conversely in the latter case, when the apparatus is applied to gage open tanks.

When adapted for tanks subject to any pressure, both the reservoir D and the gage glass E are closed at the top, one being connected by air pipe C with the line pipe B, while the other is connected with the liquid-free space in the vessel A by a return pipe B'.

F is the air inlet pipe dipping into the indicating liquid through which air is introduced by any suitable means as by a compressor which may be detachable from the pipe as indicated at G (Figs. 4 and 5). In this case any branch pipe connected with the compressor must be suitably closed before removal of the latter.

In the case of gaging apparatus applicable to tanks at any pressure the air compressor G or its equivalent is inserted in a branch pipe connecting the return pipe B' with the air inlet pipe F, an ordinary non-return valve indicated by H being interposed between the compressor and the return line pipe which closes on the compression stroke and opens to admit air or gas to the compressor on the suction or expansion stroke, or to equalize any excess of pressure in the tank. In Fig. 4 the compressor draws its air or gas from the return pipe B', while in Fig. 5 the compressor may also be arranged to introduce outside air or gas as required.

The apparatus of Figs. 1 and 4 are more conveniently used with an opaque indicating liquid, while those of Figs. 2, 3 and 5, are intended for a transparent indicating liquid, which is in this case contained within two concentric cylinders.

It will be obvious that on pumping air or gas through the pipe F the level of the indicating liquid will be depressed in one of the vessels D, E, and raised in the other to an extent depending on the pressure and the areas of the liquid surfaces in the two vessels. Instead of using the difference of level between the two surfaces to gage the depth of liquid in the containing tank, the depth may be gaged by the actual displacement of one or other of the indicating liquid surfaces, thereby reducing the length of the scale, which would of course in this case be an empirical one and not an absolute measure of the depth of liquid. By suitably proportioning the vessels D, E, and using, for example, the liquid surface in the transparent outer vessel or tube D (Fig. 6) or in the separate gage glass E′ connected with the opaque outer tube D (Fig. 7), the proportionality of the scale to the actual depth of the liquid may be given any desired value and further an opaque liquid such as mercury may be used as the indicating liquid.

Although the instrument shown in Figs. 6 and 7 remains of the same over-all length as before, the lower part of the outer vessel D can be of reduced transverse dimensions, and can be made of metal or other suitable material, and if desired disposed out of sight, or the whole of the tube D may be of metal as in Fig. 7.

It may be an advantage in some cases to separate the indicating portion of the instrument from the sealing portion, as for example, when the indicating liquid would be rapidly evaporated by blowing air or gas through it. Fig. 8 shows how the apparatus of Figs. 2 and 3 for example may be modified for this purpose. In this case the pipe F dips into a separate closed vessel K which is partially filled with a suitable non-volatile liquid, such as mercury, and has its air space connected in common with that of the gage tube D, to the branch C leading to the line pipe B.

When the exhaust gases of an internal combustion engine are available for the purpose they may be conveniently applied while still under pressure for operating the indicator.

Having thus described the nature of my said invention and the best means I know of carrying the same into practical effect, I claim:—

1. An apparatus for indicating the depth of liquid in a vessel, comprising a reservoir partially filled with indicating liquid, a pipe dipping into the vessel to be gaged and connected with the non-liquid space of the said reservoir, a second pipe dipping into a sealing fluid at the same pressure as the reservoir, and means for forcing gaseous fluid through the second pipe into the non-liquid space of the indicating apparatus, substantially as described.

2. An apparatus for indicating the depth of liquid in a tank or the like comprising two vessels communicating at their lower ends and containing indicating liquid, one of the said vessels being closed, a pipe leading from the non-liquid space of the closed vessel to the tank to be gaged and extending downwardly to the bottom thereof, a second pipe opening into the liquid space of the same closed vessel, and means for forcing gaseous fluid through the second pipe, substantially as described.

3. An apparatus for indicating the depth of liquid in a closed tank or the like, comprising two closed vessels communicating at their lower ends and containing indicating fluid, a line pipe leading from the non-liquid space of one of the closed vessels and opening into the tank to be gaged near the bottom thereof, a return pipe leading from the top of the said closed tank to the non-liquid space of the second closed vessel, a third pipe opening into the liquid space of the first closed vessel and connected with the return pipe from the tank, a non-return valve interposed in said connection, and means for forcing gaseous fluid through the third pipe into the first mentioned closed vessel, substantially as described.

In testimony whereof I have signed my name to this specification in the presence of two subscribing witnesses.

LEONARD MURPHY.

Witnesses:
JAMES MURPHY,
DAVID F. CRONIN.